United States Patent
Bordner-Babayigit et al.

(10) Patent No.: US 9,237,339 B1
(45) Date of Patent: Jan. 12, 2016

(54) FRAMEWORK FOR QUANTIFYING A TOTAL QUALITY OF EXPERIENCE FOR SUBSCRIBERS IN A COMMUNICATIONS NETWORK

(75) Inventors: Elissa Kahalelauniu Bordner-Babayigit, Norcross, GA (US); Andrei Maximenko, St. Cloud, MN (US)

(73) Assignee: Cox Communications, Inc., Atlanta, GA (US)

( * ) Notice: Subject to any disclaimer, the term of this patent is extended or adjusted under 35 U.S.C. 154(b) by 41 days.

(21) Appl. No.: 13/070,082

(22) Filed: Mar. 23, 2011

(51) Int. Cl.
*H04N 17/00* (2006.01)
*H04L 29/08* (2006.01)

(52) U.S. Cl.
CPC .......... *H04N 17/00* (2013.01); *H04L 29/08954* (2013.01)

(58) Field of Classification Search
CPC ............. H04N 17/00; H04N 29/08954; H04L 29/08954
See application file for complete search history.

(56) References Cited

U.S. PATENT DOCUMENTS

| | | | |
|---|---|---|---|
| 5,247,546 A | 9/1993 | Abbiate et al. | |
| 6,961,341 B1 | 11/2005 | Krishnan | |
| 7,719,979 B1 | 5/2010 | Chatterjee | |
| 8,102,865 B2 | 1/2012 | Berdardi et al. | |
| 9,037,699 B1 | 5/2015 | Bordner-Babayigit et al. | |
| 9,088,768 B1 | 7/2015 | Bordner-Babayigit et al. | |
| 2002/0013725 A1 | 1/2002 | Takakura et al. | |
| 2003/0204611 A1 | 10/2003 | McCosh et al. | |
| 2005/0123003 A1 | 6/2005 | Bordonaro et al. | |
| 2006/0072457 A1* | 4/2006 | Noble | 370/230 |
| 2006/0239204 A1 | 10/2006 | Bordonaro et al. | |
| 2006/0250967 A1 | 11/2006 | Miller et al. | |
| 2007/0107034 A1 | 5/2007 | Gotwals | |
| 2007/0223512 A1* | 9/2007 | Cooper et al. | 370/437 |
| 2008/0259810 A1 | 10/2008 | Diroo et al. | |
| 2009/0013210 A1 | 1/2009 | McIntosh et al. | |
| 2009/0113045 A1 | 4/2009 | Kozisek | |
| 2011/0082931 A1 | 4/2011 | Wang et al. | |
| 2011/0141925 A1 | 6/2011 | Velenko et al. | |
| 2011/0153856 A1 | 6/2011 | Piepenbrink et al. | |
| 2012/0076015 A1 | 3/2012 | Pfeffer | |
| 2013/0058248 A1 | 3/2013 | Singh et al. | |

FOREIGN PATENT DOCUMENTS

| | | | |
|---|---|---|---|
| JP | 2011/044941 | 3/2011 | |
| WO | WO 2010/012202 | * 2/2010 | H04L 12/28 |

OTHER PUBLICATIONS

Kim et al., "A Study on a Q0S/QoE Correlation Model for QoE Evaluation of IPTV Service", ICACT Feb. 2010.*
Agboma et al., "QoE-aware Qos Management", Proceedings of MoMM2008.*

(Continued)

*Primary Examiner* — Nathan Flynn
*Assistant Examiner* — James R Marandi
(74) *Attorney, Agent, or Firm* — Merchant & Gould P.C.

(57) ABSTRACT

A framework for quantifying a total quality of experience for subscribers in a communications network is disclosed. A weighted average score representing a quality of experience for at least one application is provided. A set of scores associated with network parameters is provided. A weighted sum using the set of scores and the weighted average score is calculated. A total quality of experience score based on the weighted sum is generated.

20 Claims, 11 Drawing Sheets

(56) References Cited

OTHER PUBLICATIONS

Wada et al.,"Multiobjective Optimization of SLA-aware Service Composotion", Proceedings of IEEE Congress on Servcies, Jul. 2008.*
Office Action mailed Oct. 24, 2012, in co-pending U.S. Appl. No. 13/070,082.
Agboma et al., "QoE-aware QoS Management", MoMM 2008, 12 pages.
Garrett et al., "Analysis, Modeling and Generation of Self-Similiar VBR Video Traffic", SIGCOMM 1994, 6 pages.
Office Action mailed Jan. 28, 2013 in co-pending U.S. Appl. No. 13/070,039.
U.S. Appl. No. 13/069,998, filed Mar. 23, 2011.
U.S. Appl. No. 13/070,039, filed Mar. 23, 2011.
Office Action mailed Jun. 20, 2013,in co-pending U.S. Appl. No. 13/070,039.
Office Action mailed Apr. 10, 2013 in co-pending U.S. Appl. No. 13/069,998.
Office Action mailed May 2, 2014 in co-pending U.S. Appl. No. 13/069,998, 30 pgs.
Office Action mailed May 23, 2013 in co-pending U.S. Appl. No. 13/070,039, 31 pgs.
Claypool et al.; "The Effects of Jitter on the Perceptual Quality of Video", Multimedia '99, Proceedings of the Seventh ACM International Conference on Multimedia, 1999; 4 pgs.
Office Action mailed Nov. 19, 2014 in co-pending U.S. Appl. No. 13/070,039, 35 pgs.
Notice of Allowance mailed Jan. 14, 2015 in co-pending U.S. Appl. No. 13/069,998, 13 pgs.
Notice of Allowance mailed Mar. 17, 2015 in co-pending U.S. Appl. No. 13/070,039, 10 pgs.

* cited by examiner

| Service | Application QoE | | | Signal Power | | Signal Quality | | | Network Speed |
|---|---|---|---|---|---|---|---|---|---|
| Tier Region | Latency (ms) | Jitter (ms) | Packet Loss (ratio) | Composite Score | Modem Transmit Level (dBmV) | Modem Receive Level (dBmV) | Downstream Signal-to-Noise Ratio (at modem, dB) | Upstream Signal-to-Noise Ratio (at CMTS, db) | QAM Output Modulation Error Ratio (at Edge QAM, dB) | (kbs) |
| Streaming Video | 500 | 10 | 0.5% | | +40 to +50 | -8 to +8 | 35 | 35 | 35 | 20 |

510

Weighted Average Score — 520

| Service | | Application QoE | | | Signal Power | | Signal Quality | | | Network Speed |
|---|---|---|---|---|---|---|---|---|---|---|
| Tier | Region | Latency (ms) | Jitter (ms) | Packet Loss (ratio) | Composite Score | Modem Transmit Level (dBmV) | Modem Receive Level (dBmV) | Downstream Signal-to-Noise Ratio (at modem, dB) | Upstream Signal-to-Noise Ratio (at CMTS, db) | QAM Output Modulation Error Ratio (at Edge QAM, dB) | (kbs) |
| Streaming Video | | 800 | 5 | 0.2% | | 35 | 8 | 38 | 37 | 40 | 24 |
| Weighted Average Score | | | | | | | | | | | |

*Fig. 6*

| Service | | Application QoE | | | | Signal Power | | Signal Quality | | | Network Speed | |
|---|---|---|---|---|---|---|---|---|---|---|---|---|
| Tier | Region | Latency (ms) | Jitter (ms) | Packet Loss (ratio) | Composite Score | Modem Transmit Level (dBmV) | Modem Receive Level (dBmV) | Downstream Signal-to-Noise Ratio (at modem, dB) | Upstream Signal-to-Noise Ratio (at CMTS, db) | QAM Output Modulation Error Ratio (at Edge QAM, dB) | (kbs) | |
| Streaming Video | | -0.6 | 0.5 | 0.6 | 0.34 | | | | | | | |
| Weighted Average Score | | | | | 0.34 | -0.125 | 0.375 | 0.086 | 0.057 | 0.143 | 0.2 | 0.23 |

*Fig. 7*

FRAMEWORK FOR QUANTIFYING A TOTAL QUALITY OF EXPERIENCE FOR SUBSCRIBERS IN A COMMUNICATIONS NETWORK

CROSS-REFERENCE TO RELATED APPLICATIONS

The present application is related to U.S. application Ser. No. 13/070,039, filed Mar. 23, 2011, entitled "PROCESSING QUALITY OF SERVICE DATA TO PROVIDE A PREDICTION OF QUALITY OF EXPERIENCE," and U.S. application Ser. No. 13/069,998, filed Mar. 23, 2011, entitled "STATISTICALLY DETERMINING AVERAGE NETWORK SPEED IN A COMMUNICATIONS NETWORK," which are incorporated herein by reference.

FIELD OF THE INVENTION

This disclosure relates in general to hybrid fiber coaxial networks, and more particularly to providing a framework for quantifying a total quality of experience for subscribers in a communications network.

BACKGROUND

As service providers move forward with network optimization strategies, including congestion management, the need to ensure satisfactory customer quality of experience (QoE) will be critical.

High speed Internet customers no longer see the Internet as a platform for publishing and sharing static images. They are relying more and more on their service for entertainment, education and information, and their expectations of their broadband provider have increased as well. Therefore, the driving factors of rapid broadband deployment are the services that can be delivered on top of this technology. The services that are offered today go far beyond the best-effort services of a decade ago. The Internet technologies are being used to form an infrastructure that delivers data, audio and video traffic at the same time. QoE is essential for all these services. Multimedia services like IPTV are particularly sensitive to packet loss, delay and jitter, and often require a substantial amount of bandwidth, so a mechanism must be in place to detect QoE degradation and react appropriately to restore it.

Rapidly increasing video quality combined with rapidly increasing adoption, leads to traffic growth rates that put serious pressure on the network infrastructure. It is expected that IP traffic will double every two years. With broadband becoming ubiquitous, providing not only adequate but enhanced QoE will be the primary point of differentiation when it comes to customers' satisfaction and subscriber growth.

Existing research has identified key factors in customer experience that impact traditional best-effort broadband service QoE. Delay is one such factor. Delay refers to the initial system response time from providing URL until the end-user is aware that a download has started. The data download speed is frequently communicated to the end-user by means of a file transfer dialogue box that includes a numeric display of download status (% or number of bytes downloaded/total bytes) or by a network rate meter. The consistency of download speed is another factor that affects the customer experience. If the download is at a steady rate, then the user has a good idea (either intuitively or through a meter) of when it will finish. If on the other hand the rate varies greatly, then the finish time is much less certain and the user cannot plan how to use the intervening period so effectively. The incremental display factor is the time before there is some new, intelligible content to view. It is often the case that the display starts to update before the download is complete. As soon as the user has some new information to consider, the fact that the download is still in progress is of less importance. Action availability is the time before the user can undertake the next step in the browsing process, e.g., a new link or action button becomes useable. Again this may be before the download is complete. Finally, the absolute time until the download is complete has an impact on the customer experience.

Data associated with parameters of the network, such as such as jitter, latency, packet loss, signal power, signal quality, etc., are an objective measurement of the technical health of the network. However, the customer experience, i.e., quality of experience (QoE), should reflect the actual experience of the customer, not the measure of what is technically occurring on the network.

Moreover, even if individual quality of service parameters are correlated with aspects of the quality of experience of a subscriber, quantifying how to score the overall experience of a subscriber is still elusive. For example, providing a certain bandwidth may be very important to an actual customer experience, but the customer's response needs to be included in any quantification of QoE. Having a 40 megabit per second downloading capability is faster than having a 20 megabit per second, but if the customer does not see much of a difference, then the difference is not that important to the customer. What matters is how the customer is impacted.

Accordingly, there is a need for providing a framework for quantifying a total quality of experience for subscribers in a communications network.

SUMMARY OF THE INVENTION

To overcome the limitations described above, and to overcome other limitations that will become apparent upon reading and understanding the present specification, embodiments for providing a framework for quantifying a total quality of experience for subscribers in a communications network are disclosed.

An embodiment includes method for providing a framework for quantifying a total quality of experience for subscribers in a communications network is disclosed. The method includes providing a weighted average score representing a quality of experience for at least one application, providing a set of scores associated with network parameters, calculating a weighted sum using the set of scores and the weighted average score and generating a total quality of experience score based on the weighted sum.

In another embodiment, a system for providing a framework for quantifying a total quality of experience for subscribers in a communications network is provided. The system includes a headend for providing video and data to a plurality of subscriber equipment via a hybrid fiber/coax (HFC) network, a plurality of distribution hubs, the plurality of distribution hubs coupling network elements from subscriber equipment to the headend and a storage device, coupled to the headend, for storing states for a plurality of network parameters and scores associated with a level of satisfaction with the service being provided to the set of subscribers provided by the set of subscribers while the states for a plurality of network parameters are varied, wherein the headend further comprises a processor for providing a framework to quantify a total quality of experience for subscribers in a communications network, the processor provides a weighted average score representing a quality of experience for at least one application, provides a set of scores associated with network parameters, calculates a weighted sum using the set of scores and the weighted average score and generates a total quality of experience score based on the weighted sum.

In another embodiment a computer readable medium including executable instructions which, when executed by a processor, provides a framework for quantifying a total quality of experience for subscribers in a communications network is disclosed. The processor executes the steps of providing a weighted average score representing a quality of experience for at least one application, providing a set of scores associated with network parameters, calculating a weighted sum using the set of scores and the weighted average score and generating a total quality of experience score based on the weighted sum.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout:

FIG. 5 shows hypothetical "good" QoE thresholds for the streaming video application according to one embodiment;

FIG. 6 show hypothetical data for the streaming video application according to one embodiment;

FIG. 7 shows the hypothetical standardized values for streaming video according to one embodiment;

DETAILED DESCRIPTION

Embodiments of the present invention are directed to providing a framework for quantifying a total quality of experience for subscribers in a communications network. A weighted average score representing a quality of experience for at least one application is provided. A set of scores associated with network parameters is provided. A weighted sum using the set of scores and the weighted average score is calculated. A total quality of experience score based on the weighted sum is generated.

Figure 1:
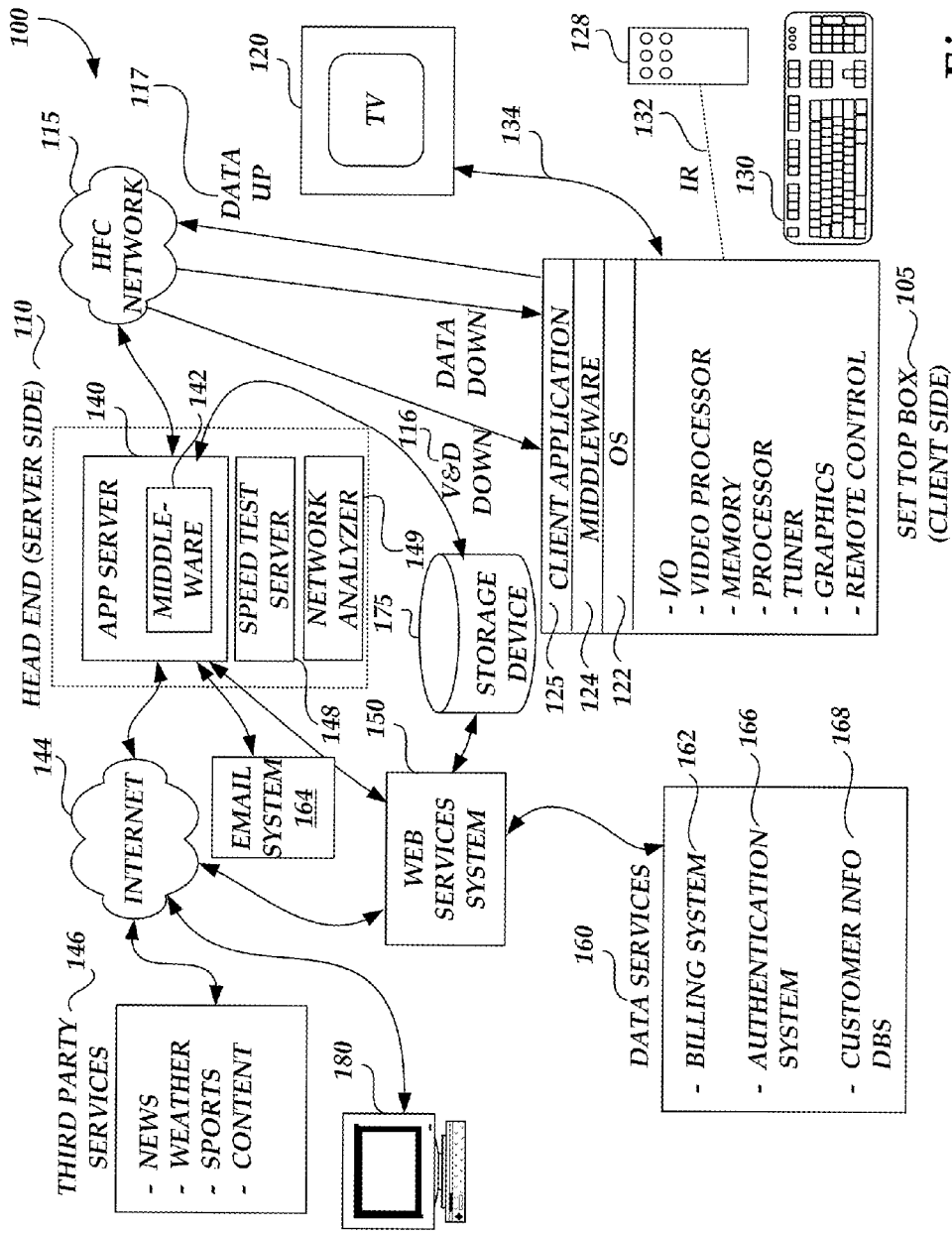
FIG. 1 is a simplified block diagram illustrating a cable television/services system architecture that serves as an exemplary operating environment for the present invention.

FIG. 1 is a simplified block diagram illustrating a cable television/services system 100 (hereafter referred to as "CATV") architecture that serves as an exemplary operating environment for the present invention. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink 116 and data via a data downlink/uplink 117.

The STB 105 may transmit data from the client side of the CATV system 100 to the server side of the CATV system 100 via the HFC network 115 via one data uplink. The data downlink/uplink 117, illustrated in FIG. 1, between the HFC network 115 and the set-top box 105 comprise "out of band" data links. As is understand by those skilled in the art, the "out of band" frequency range generally lies between zero and 54 megahertz.

According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105. Speed test server 148 may be used to determine the speed of a modem, which then can be used to calculate an average Network Speed.

According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

An electronic mail system 164 may contain information such as electronic mail addresses, high-speed Internet access subscription information and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. Storage device 175 may be used to store data for the headend 110 and act as a central network speed database. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

The headend 110 may include a speed test server 148. Alternatively, speed test servers may be distributed throughout the HFC network 115. The speed test server 118, whether in the headend 110 or distributed throughout HFC network 115 poll a predetermined number of set-top boxes 105 a predetermined number of times, wherein the number of polls is selected to provide sufficient data for statistical modeling of the average network speed. Polling should also be configured to use random subscribers. The results of the polling may be sorted by tier or other parameters.

All data involved with performing quality of experience tests is controlled and processed by a processor 149. All data is stored in storage device 175. Correlation between measured network parameters and the quality of experience may be determined based on information gathered from subscribers. The processor 149 then can process the data in storage device 175 to quantifying a total quality of experience for subscribers in a communications network.

Figure 2:
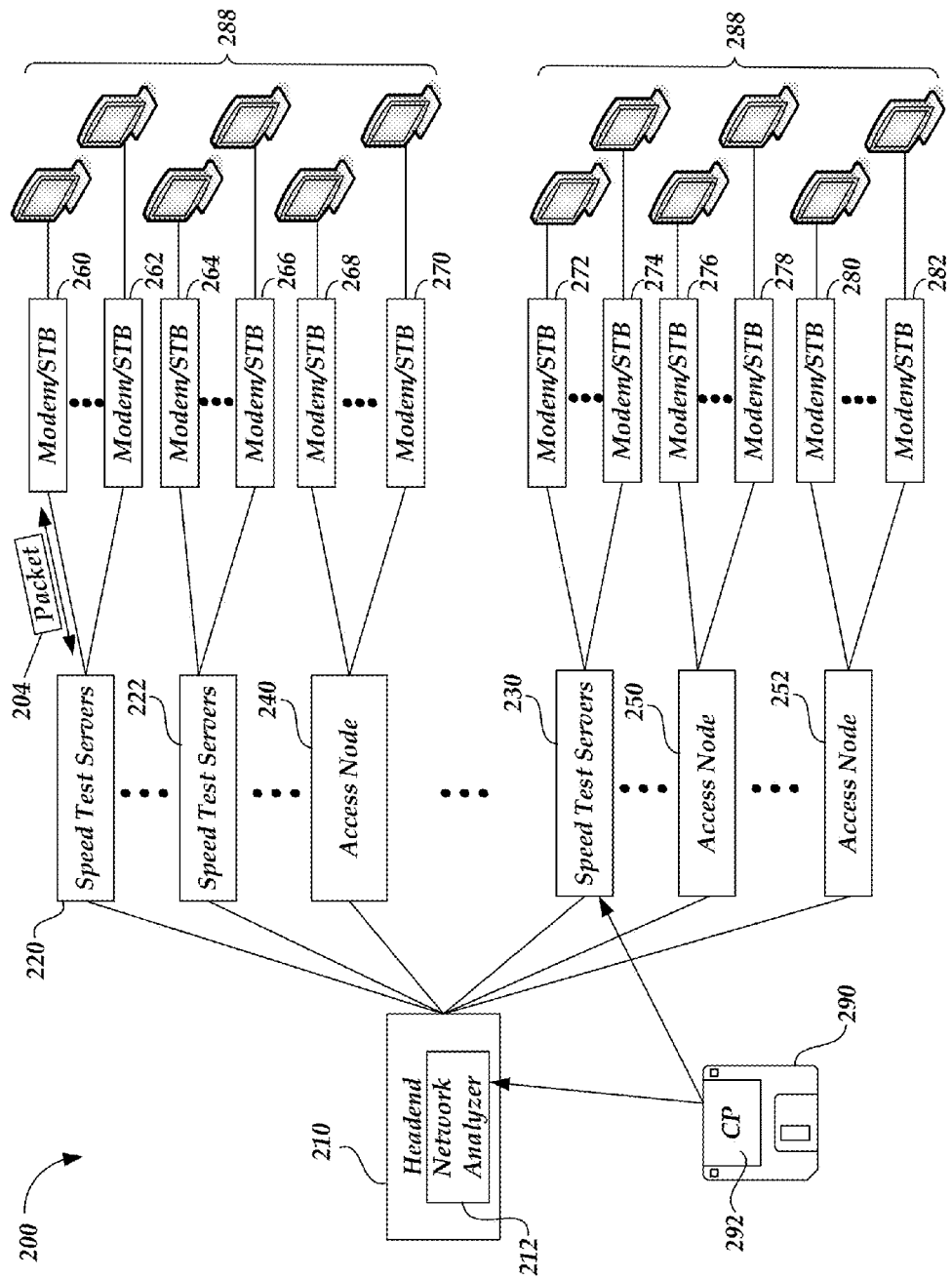
FIG. 2 shows a system having speed test servers according to an embodiment of the invention.

FIG. 2 shows a system having speed test servers 200 according to an embodiment of the invention. In FIG. 2, a headend 210 provides signals over the network for provisioning at televisions/computers 288 of subscribers. Speed test servers 220, 222, 230 are distributed throughout the network. However, every modem or set-top box is not tested. Rather, a number of speed test servers 220, 222, 230 are selected to provide sufficient data to provide a statistical model for the network. While speed test servers 220, 222, 230 are illustrated, those skilled in the art will recognize that additional functionality is provided to provision information at televisions/computers 288. Therefore, some nodes are simply illustrated as access nodes 240, 250, 252. Access nodes 240, 250, 252 convey that such nodes do not include speed test servers. Access nodes 240, 250, 252 and speed test servers 220, 222, 230 serve as distribution hubs to connect segments, or network elements, in the network and are configured to transfer signals between the headend 210 and modem/set-top boxes 260-282 of subscribers.

In FIG. 2, the nodes, including speed test servers 220, 222, 230 and access nodes 240, 250, 252 communicate with modem/set-top boxes 260-282. Set-top boxes 260-282 connect to televisions 288 and are configured to process received signals into content that then may be displayed on the television screen or other display device. A modem 260-282 is used to provide bi-directional data communication to deliver broadband Internet access. Herein, the term modem will be used to refer to a device for providing conditional access to information, including a set-top box or modem 260-282.

As mentioned, the quality of service can be degraded if there is too much traffic on the network. In such an instance, the speed slows down and the subscriber becomes aware of the issue. The speed test servers 220, 222, 230 may thus perform an Internet Control Message Protocol (ICMP) ping test that sends a test packet 204 to a modem 260-282 to determine how quickly the packet arrives at the modem 260-282 along the network. To minimize the number of the ICMP ping test, which can clog the network with test traffic, a limited number of tests are performed and then, from those tests, the average network speed may be statistically determined by a processor 212. The result will not be the speed for each individual customer, but rather an average network speed. The average network speed is what a typical subscriber should expect to see.

For example, four tests are conducted during the day at four different times. The data is statistically analyzed to predict the speed on the network at times not represented by the times of the test. The statistical information regarding the average network speed may be shared with network managers and with subscribers. The statistical analysis is based on the mathematical relationship between the volume of traffic and an average speed. The dynamic of the volume of network traffic during the day can be obtained from historical data. An analysis of the trend in network traffic may be used to identify the peaks and low traffic times during the day.

Considering these factors, the requirement for speed test servers 220, 222, 230 should reflect the need to poll a sample of specified size and the need to poll specified number of times during 24 hour period. The minimum feasible sample size can be determined by the equation:

$$n=(Z/e)^2,$$

where n is the sample size, Z is the z-score relating to selected confidence level, and e is the proportion of acceptable error.

A high confidence level, such as α=0.99999 (or 99.999%) should be chosen. For this confidence level, Z=4.2. The proportion of acceptable error should also be set relatively low. Suggested possible error values are e=0.05 (or 5%), e=0.03 (or 3%), or e=0.01 (or 1%). With all three error values, the calculated sample size is large enough to provide adequate sub-samples for smaller tiers and ensure proportional representation of all tiers. Decision regarding appropriate sample size should be based on desired accuracy of average speed measurement, as well as practical feasibility.

In determining testing frequency, the distribution of bandwidth consumption rates over an average 24 hour period is a relatively well-behaved sinusoid-shaped line with a single peak and a single trough. While it is always preferable to test as frequently as possible, based on the shape of the distribution, at least four data points will likely be necessary for construction of a relatively reliable inferential model for average network speed: average speed at maximum consumption level, average speed at minimum consumption level, and average speed at two consumption midpoints between maximum and minimum.

Embodiments for providing a framework for quantifying a total quality of experience for subscribers in a communications network may be implemented in a suitable computing environment. Embodiments may also be implemented in combination with other types of computer systems and program modules. Generally, program modules include routines, programs, components, data structures, and other types of structures that perform particular tasks or implement particular abstract data types. By way of example, computer readable media 290 can include computer storage media and communication media. Computer storage media 290 includes volatile and nonvolatile, removable and non-removable media implemented in any method or technology for storage of information 292, such as computer readable instructions, data structures, program modules or other data.

Computer storage media 290 typically embodies computer readable instructions, data structures, program modules, etc. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in the headend 210 and/or in speed test servers 220, 222, 230.

Embodiments implemented on computer-readable media 290 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 290 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by a processing device. As mentioned briefly above, a number of program modules and data files may be stored and arranged for controlling the operation of processing devices. Thus, processing devices, such as processor 212 provided by the headend 210 and/or in speed test servers 220, 222, 230, may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Figure 3:
FIG. 3 shows a chart of various parameters for use in quantifying QoE according to one embodiment.

FIG. 3 shows a chart of various parameters for use in quantifying QoE 300 according to one embodiment. Internet Protocol Detail Record (IPDR) 310 is used to obtain measures for number of delayed, lost, and sent packets by modem, which can be used to calculate Packet Loss ratio. Edgehealth 320 is used to obtain measures for transmit and receive levels by modem and signal-to-noise ratio by modem, which is a direct measure of Modem Transmit Level, Modem Receive Level, and Downstream Signal-to-Noise Ratio. Proviso 330 is used to obtain measures for signal-to-noise ratio by CMTS and modulation error ratio by QAM, which is a direct measure of Upstream Signal-to-Noise Ratio and QAM Output Modulation Error Ratio. Speed test servers 340 are used to obtain the speed by modem which can be used to calculate average Network Speed. DPI-Procera 350 is used for direct identification of protocol/application by datastream which is used for direct identification of Application type. ICMP 360 ping tests are used to obtain measures for average packet delay, packet delay by individual packet, and number of packets loss/sent. The utility for QoE is possible use with DPI to directly measure Latency, and calculate Jitter and Packet Loss ratio for an application.

Quantifying the Quality of Service (QoS) is objective because it is based on objective measures of network health. In contrast, quantifying the Quality of Experience (QoE) is more of a subjective measure of a customer's satisfaction. Traditionally QOS has been used interchangeably with QoE. There really has not been a distinction between QoS and QoE. However, the studies of actual human experience with the Internet note a clear distinction between QoS and QoE.

Service providers tout their competitive advantages in terms of what they that can technically provide. For example, one service provider may tout that they can achieve a certain network speed or that they can achieve a certain latency. Thus, the QOE aspect in this competitive marketing really does not exist. Everyone is really just talking about QOS.

However, providing a certain bandwidth may be very important to an actual customer experience, but the customer's response needs to be included in any quantification of QoE. Having a 40 megabit per second downloading capability is faster than having a 20 megabit per second, but if the customer does not see much of a difference, then the difference is not that important to the customer. What matters is how the customer is impacted.

Figure 4:
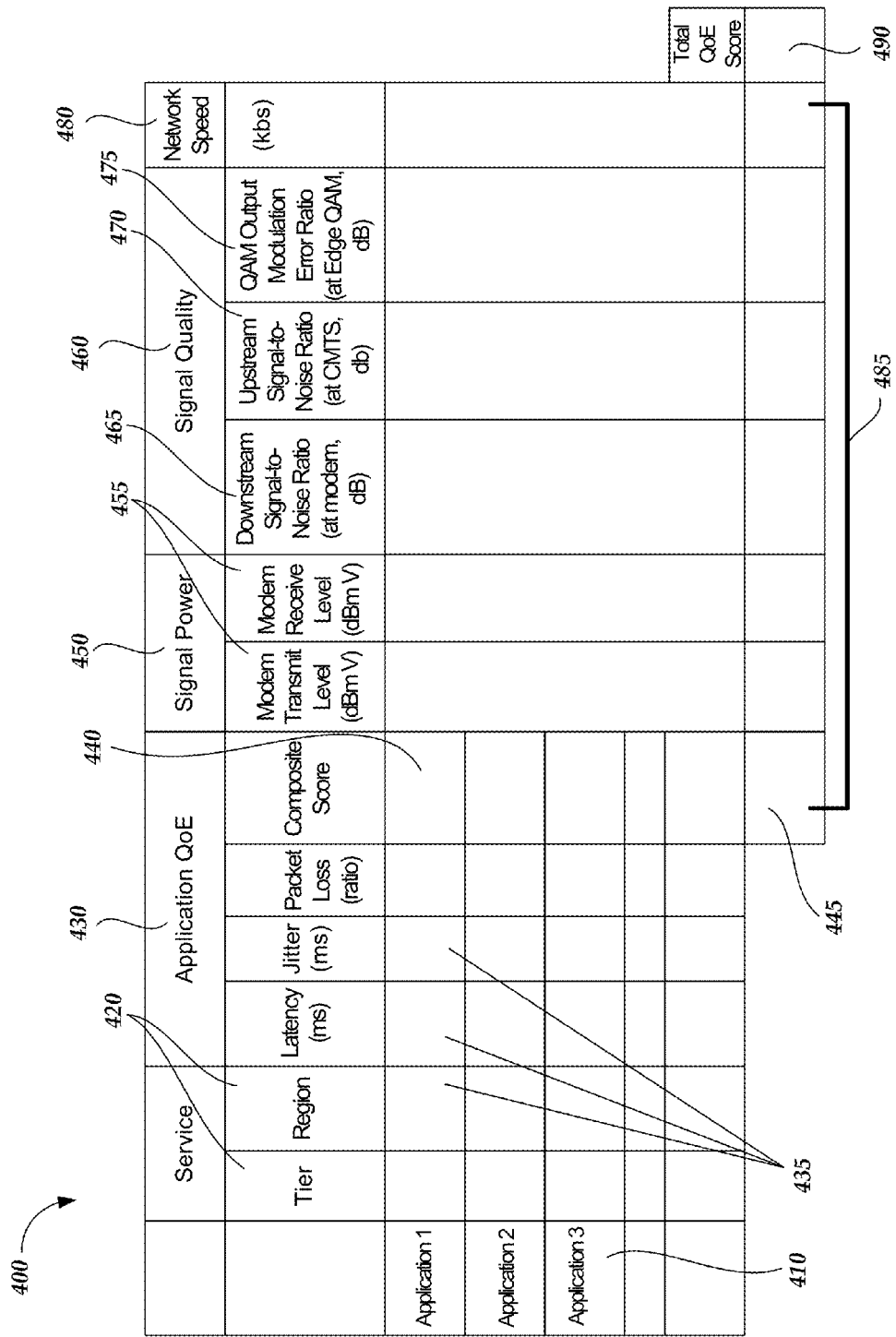
FIG. 4 shows a template for quantifying QoS to QoE according to one embodiment.

FIG. 4 shows a template for quantifying QoS to QoE 400 according to one embodiment. The QoE template 400 provides a framework to capture, measure, and predict the customer's total Quality of Experience (QoE) 490 and also application-specific QoE 440. Application-specific Quality of Experience (QOE) composite measurements 440 are included along with additional common factors of Signal Power 450, the Signal Quality 460, and the Network Speed 480. The service tier and region 420 are entered for the application. The application QoE Composite Score 440 is calculated from standardized values of Latency, Jitter, and Packet Loss 435 (i.e., measured in terms of average deviations) weighted by each measure's importance to an application. The default Composite Score 440 is 0. The Weighted Average Score 445 is the average of composite scores weighted by popularity of corresponding applications. The Modem Transmit level and Modem Receive level 455 are entered for Signal Power 450. Signal Quality 460 includes the Downstream Signal-to-noise Ratio 465, the Upstream Signal-to-Noise Ratio 470, and QAM Output Modulation Error Ratio 475. Total QoE score 490 is a weighted sum of bottom line scores 485 with the default value=0.

FIG. 5 shows hypothetical "good" QoE thresholds for the streaming video application 500 according to one embodiment. The thresholds for Streaming Video 510 are used to calculate standardized values (measured in terms of average deviations) for the bottom line scores 520.

FIG. 6 show hypothetical data for the streaming video application 600 according to one embodiment. Streaming Video 610 data values are used to calculate standardized values along with the threshold values (see FIG. 5).

FIG. 7 shows the hypothetical standardized values for streaming video 700 according to one embodiment. For Application QoE 710, "Standardized Value"=(Threshold value−Data value)/Threshold value. For Signal Power, Signal Quality, and Network Speed 720, "Standardized Value"=

(Data Value–Threshold Value)/Threshold Value. For "ranged" thresholds (Modem Transmit Level and Modem Receive Level), "Threshold value" is the value of the proximate range boundary (see FIG. 4). Since there is only one application in this example, the Weighted Average Score 710 is the same as application Composite Score 730. The Total QoE score 740 is a weighted sum of the bottom line scores Weighted Average Score 710 and Signal Power, Signal Quality, and Network Speed 720.

Accordingly, all of the factors are entered into the chart 700. As can be seen in FIG. 7, data from the speed test servers, as discussed earlier, are included. Thus, data from the speed test servers are used for two purposes. The first is for determining an average network speed that may be used to discuss service with subscribers. However, the average network speed is also a parameter that is included in the determination of the QoE. When the data entered into the chart 700 meets a certain threshold, the QoE is determined to meet expectations.

Regression analysis may be used to correlate QoE with QoS. As discussed earlier, QoS is a measure of technical health of the network and is thus based on measurements of network parameters, such as jitter, latency, packet loss, signal power, signal quality, etc. QoE should reflect the actual experience of the customer, not the measure of what technically is occurring on the network. Of course, QoS and QoE will be related to a degree because the technical issues with the network will impact the customer. However, QoS and QoE are not the same thing. Because the subscribers cannot be polled constantly, a prediction of the QoE is generated based on measured network parameters.

Correlation between measured network parameters and the quality of experience is based on information gathered from subscribers. A mean obtained score (MOS) is determined based on the subscriber input. Then latency, jitter, packet loss, etc. is used to correlate to the MOS based on subscriber input. In addition, signal power and signal quality are included as factors that are considered when predicting the QoE for subscribers based on regression analysis.

For example, when testing a subscriber's response to downloads, the download speeds are adjusted and the subscriber's evaluation of the experience is noted. Data is collected showing the various parameters of network tests that have been conducted. Then, for each set of parameters, a measure of customer's experience is noted. All of this data is then statistically analyzed to produce scores for QoE. Accordingly, composite scores are calculated, the weighted average score are calculated and then the total QOE is generated. A default score of zero indicates that the service matches the standard quality of experience. A negative score indicates the service is below the standard for quality of experience. A positive score indicates that the service exceeds the expectation of subscribers.

When a negative score is identified, the components for the score are analyzed to determine the source of the low score. Since each of the components will have a different weight, there may be a very small variation, but the variation may be associated with a very important component. For instance for voice conversations over Internet, latency is a serious issue. Packet loss is much less of a problem. Thus, if a conversation is scoring high on packet loss and maybe other metrics but it is scoring somewhat low on latency, the whole QoE is lowered because latency is weighted much more. Accordingly, network management procedures must be analyzed to correct for latency. Thus, QoE may not only be used to identify and correct a network problem, QoE may also be used to provide guidance when designing or expanding a network.

Figure 8:
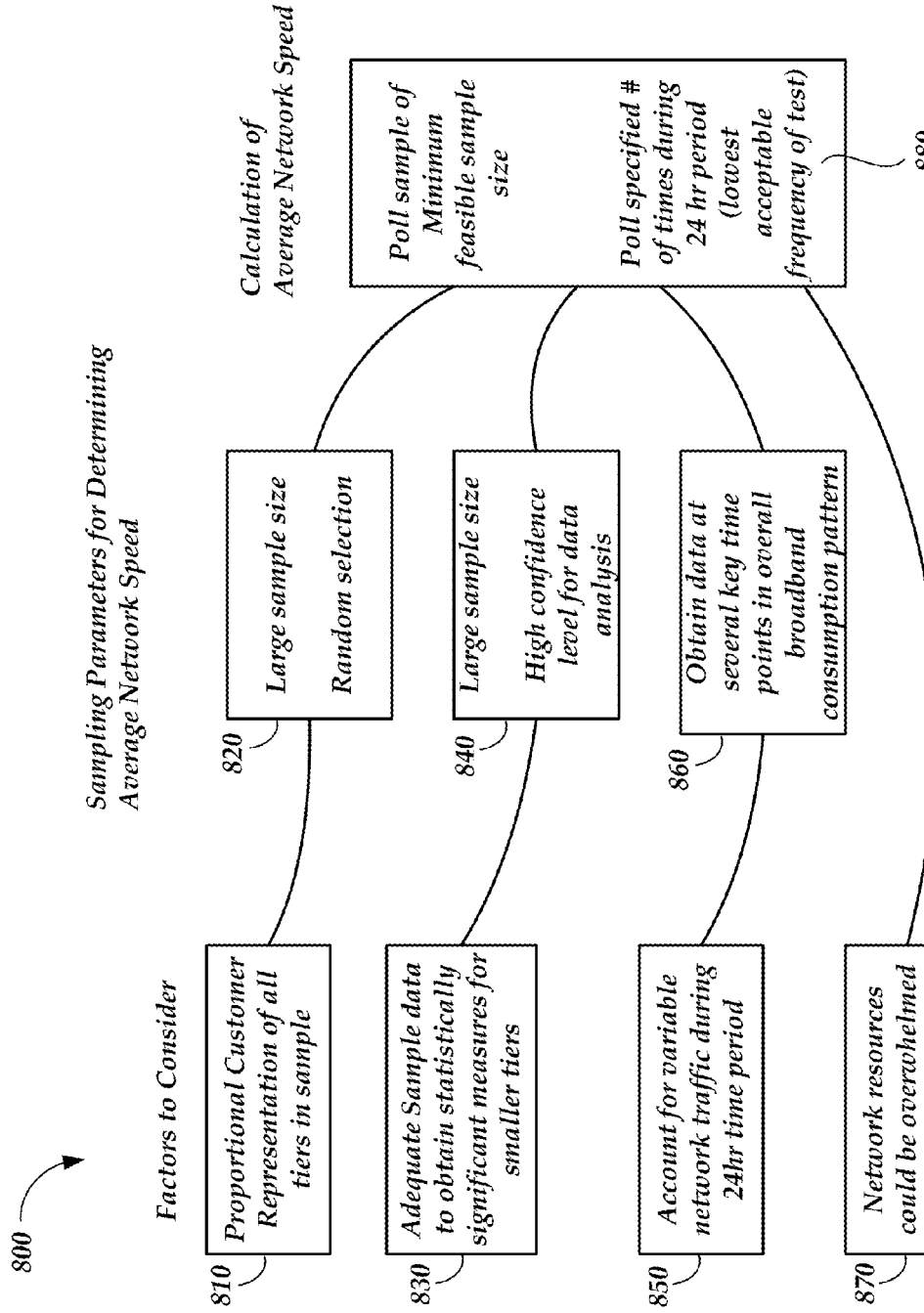
FIG. 8 shows the factors to consider for a sampling strategy to obtain reliable data to determine average network speed and the feasible solutions according to one embodiment.

FIG. 8 shows the factors to consider for a sampling strategy to obtain reliable data to determine average network speed and the feasible solutions 800 according to one embodiment. The network speed is used in calculating the Total QoE score (see FIG. 1). Since customers (cable modems) are not uniformly distributed across tiers there is a need to ensure proportional representation of all tiers in obtained sample 810. The solution is large sample size and random selection 820. There is a need to ensure adequate sample data to obtain statistically significant measures for smaller tiers 830. Again the solution is a large sample size, setting a high confidence level for data analysis 840. Actual speed on the network will vary with overall traffic congestion so a need to account for variable network traffic during 24 hour time period 850 is a factor to consider. The solution is to obtain data at several key time points in overall broadband consumption pattern, use post-test statistical modeling for inference 860. Network resources could be overwhelmed by large-scale tests 870. Therefore the preferred solution is to determine the minimum feasible sample size that ensures representativeness as well as statistical significance of obtained measures 880. In addition, the lowest acceptable frequency of tests should be conducted over a 24 hour period. This number will be determined by use of a previously established pattern of distribution of bandwidth consumption over a 24 hour period (as measure of network traffic congestion) and the inverse relationship between congestion and network.

Figure 9:
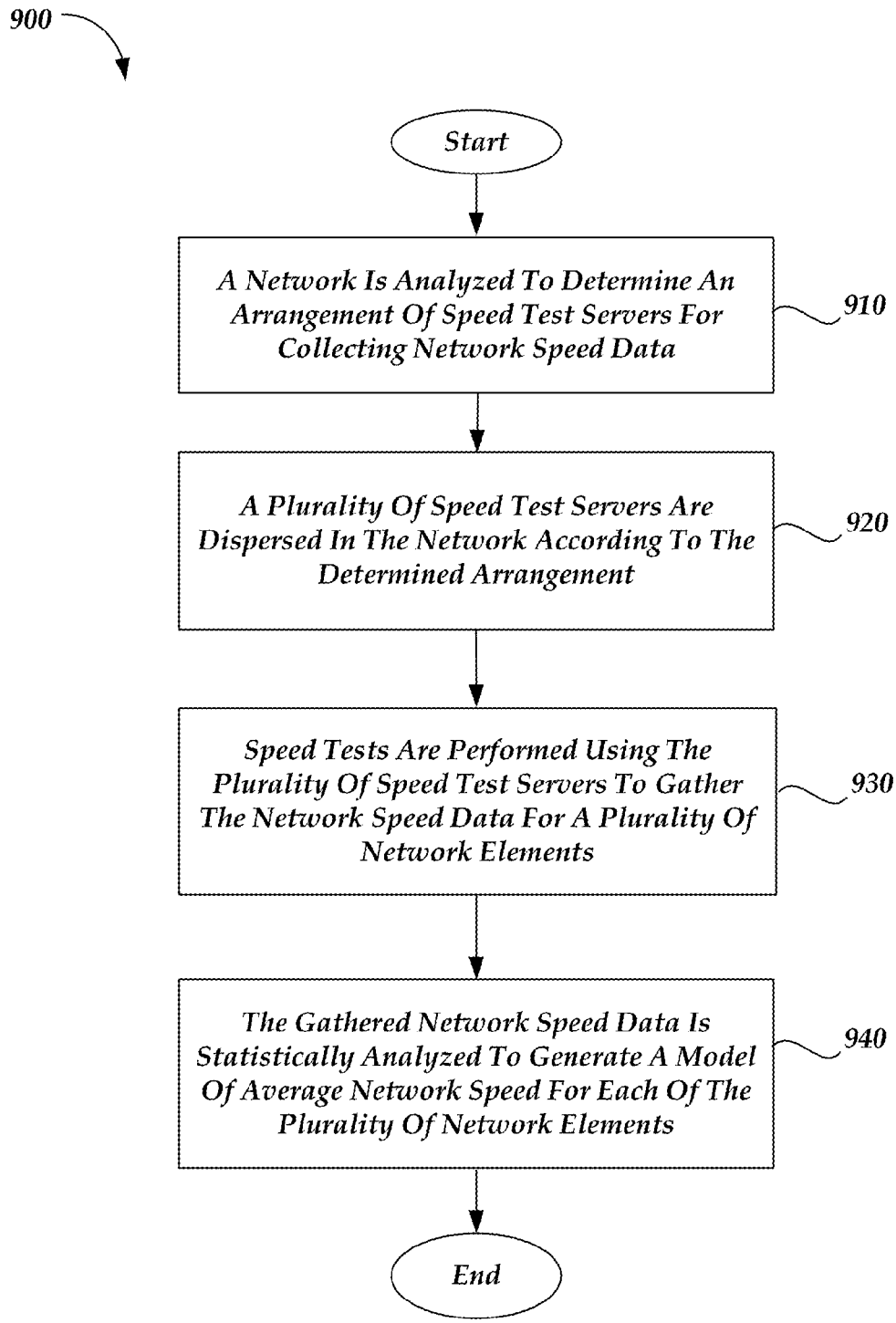
FIG. 9 is a flow chart of a method for statistically determining the average network speed in a communications network according to an embodiment.

FIG. 9 is a flow chart 900 of a method for statistically determining the average network speed in a communications network according to an embodiment. In FIG. 9, a network is analyzed to determine an arrangement of speed test servers for collecting network speed data 910. A plurality of speed test servers is dispersed in the network according to the determined arrangement 920. Speed tests are performed using the plurality of speed test servers to gather the network speed data for a plurality of network elements 930. The gathered network speed data is statistically analyzed to generate a model of average network speed for each of the plurality of network elements 940.

Figure 10:
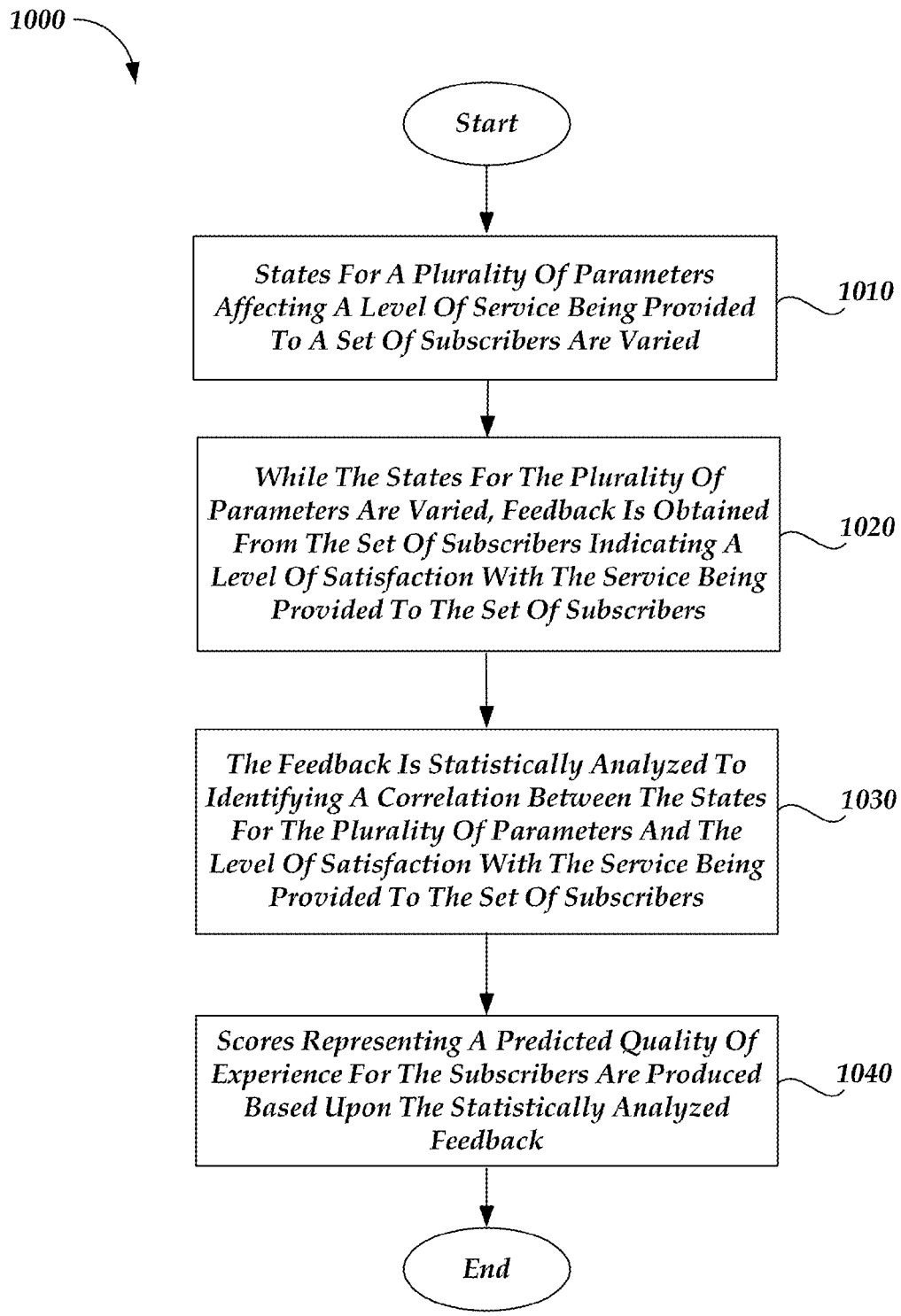
FIG. 10 is a flow chart of a method for correlating quality of service with quality of experience according to an embodiment.

FIG. 10 is a flow chart 1000 of a method for correlating quality of service with quality of experience according to an embodiment. In FIG. 10, states for a plurality of parameters affecting a level of service being provided to a set of subscribers are varied 1010. While the states for the plurality of parameters are varied, feedback is obtained from the set of subscribers indicating a level of satisfaction with the service being provided to the set of subscribers 1020. The feedback is statistically analyzed to identifying a correlation between the states for the plurality of parameters and the level of satisfaction with the service being provided to the set of subscribers 1030. Scores representing a predicted quality of experience for the subscribers are produced based upon the statistically analyzed feedback 1040.

Figure 11:
FIG. 11 is a flow chart of a method for processing quality of service data to provide a prediction of quality of experience according to an embodiment.

FIG. 11 is a flow chart 1100 of a method for processing quality of service data to provide a prediction of quality of experience according to an embodiment. In FIG. 11, a weighted average score representing a quality of experience for at least one application is provided 1110. A set of scores associated with network parameters is provided 1120. A weighted sum is calculated using the set of scores and the weighted average score 1130. A total quality of experience score is generated based on the weighted sum 1140.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method, implemented by a computer, for providing a framework for quantifying a total quality of experience for subscribers in a communications network, comprising:
   providing a headend for providing video and data to a plurality of subscribers having subscriber equipment via a network;
   obtaining feedback from a set of subscribers of the plurality of subscribers wherein the feedback comprises:
      providing from the set of subscribers a set of scores representing a quality of experience associated with a first application, each of the set of scores being weighted by each score's importance to the first application;
      providing from the set of subscribers a second set of scores representing a quality of experience associated with a second application, each of the second set of scores being weighted by each score's importance to the second application;
      calculating, via the processor, a composite score for the quality of experience for the first application based on the first set of scores from each subscriber of the set of subscribers;
      calculating, via the processor, a composite score for the quality of experience for the second application based on the second set of scores from each subscriber of the set of subscribers; and
      calculating, via the processor, a weighted average score, the weighted average score being the average of composite scores for the first and second applications from each subscriber of the set of subscribers;
   foregoing receiving feedback from the plurality of subscribers other than the set of subscribers;
   providing, via the processor, a third set of scores associated with network parameters that are not weighted based on the first and second applications;
   generating, via the processor, a total quality of experience score for the plurality of subscribers based on the weighted average score of the first and second applications from the set of subscribers and the third set of scores associated with network parameters; and
   providing services over the network to the plurality of subscribers including other than the set of subscribers based on statistical analyzed feedback including the total quality of experience score from the set of subscribers.

2. The method of claim 1, wherein the calculating the weighted average score comprises providing an average of composite scores weighted by popularity of each application of the first and second applications.

3. The method of claim 1, wherein the calculating the weighted average score comprises providing standardized values of latency, jitter, and packet loss weighted by a factor representing importance to each of the first and second applications.

4. The method of claim 3, wherein the providing the standardized values comprises providing values measured in terms of average deviations.

5. The method of claim 1, wherein the providing a third set of scores associated with network parameters further comprises:
   providing a first score representing signal power associated with the first and second applications;
   providing a second score representing signal quality associated with the first and second applications; and
   providing a third score representing an average network speed associated with the first and second applications.

6. The method of claim 5, wherein the providing a second score representing signal quality comprises providing a downstream signal-to-noise ratio, a upstream signal-to-noise ratio, and a QAM output modulation error ratio.

7. The method of claim 5, wherein the providing the first score, second score and third score comprise calculating a standardize value represented by (data value−threshold value)/threshold value.

8. The method of claim 5, wherein the providing a third score representing an average network speed further comprises sending test packets to modems for a plurality of network elements in the network to determine a transit time for the packets to arrive at the modems and gathering the network speed data for the plurality of network elements in a storage device at a headend.

9. The method of claim 1, wherein the providing a third set of scores associated with network parameters further comprises using a modem transmit level and a modem receive level for signal power levels.

10. A system for processing quality of service data to provide a prediction of quality of experience, comprising:
   a headend for providing video and data to a plurality of subscribers having subscriber equipment via a hybrid fiber/coax (HFC) network;
   a plurality of distribution hubs, the plurality of distribution hubs coupling network elements from the subscriber equipment to the headend; and
   a storage device, coupled to the headend, for storing states for a plurality of network parameters and scores associated with a level of satisfaction with the service being provided wherein the scores are being provided by a set of subscribers of the plurality of subscribers while the states for a plurality of network parameters are varied;
   wherein the headend further comprises a processor for providing a framework to quantify a total quality of experience for the plurality of subscribers in a communications network, the processor obtaining feedback from the set of subscribers wherein the feedback comprises a set of scores representing a quality of experience associated with a first application and a second set of scores representing a quality of experience associated with a second application, each of the set of scores from the set of subscribers being weighted by each score's importance to the first and second applications, calculating a composite score for the set of subscribers for the quality of experience for the first and second applications, calculating a weighted average score, the weighted average score being the average of composite scores for the first and second applications from the set of subscribers, foregoing receiving feedback from the plurality of subscribers other than the set of subscribers, providing a third set of scores associated with network parameters that are not weighted based on the first and second applications, and generating a total quality of experience score for the plurality of subscribers based on the weighted average score of the first and second applications from the set of subscribers and the third set of scores associated with network parameters, and providing services over the network to the plurality of subscribers including other than the set of subscribers based on statistical analyzed feedback including the total quality of experience score from the set of subscribers.

11. The system of claim 10, wherein the processor calculates the weighted average score by using an average of composite scores weighted by popularity of each application of the first and second applications.

12. The system of claim 10, wherein the processor calculates the weighted average score by using standardized values of latency, jitter, and packet loss weighted by a factor representing importance to each of the first and second applications.

13. The system of claim 10, wherein the standardized values comprises values measured in terms of average deviations.

14. The system of claim 10, wherein the processor calculates a third set of scores associated with network parameters by:
   processing a first score representing signal power associated with the first and second applications;
   processing a second score representing signal quality associated with the first and second applications; and
   processing a third score representing an average network speed associated with first and second applications.

15. The system of claim 14, wherein the processor calculates a second score representing signal quality using a downstream signal-to-noise ratio, a upstream signal-to-noise ratio, and a QAM output modulation error ratio.

16. The system of claim 14, wherein the processor calculates a standardize value represented by (data value−threshold value)/threshold value.

17. The system of claim 14, wherein the processor processes a third score representing an average network speed by using a determined transit time for the packets to arrive at the modems after being transmitted by speed test servers.

18. The system of claim 10, wherein the processor calculates a third set of scores associated with network parameters using a modem transmit level and a modem receive level for signal power levels.

19. A computer readable storage device including executable instructions which, when executed by a processor, provides a framework for quantifying a total quality of experience for subscribers in a communication network by:
   obtaining feedback from a set of subscribers of a plurality of subscribers;
   providing from the set of subscribers a set of scores representing a quality of experience associated with a first application, each of the set of scores being weighted by each score's importance to the first application;
   providing from the set of subscribers a second set of scores representing a quality of experience associated with an application, each of the second set of scores being weighted by each score's importance to the second application;
   calculating a composite score for the quality of experience for the first application based on the first set of scores from the set of subscribers;
   calculating a composite score for the quality of experience for the second application based on the second set of scores from the set of subscribers;
   calculating a weighted average score, the weighted average score being the average of composite scores for the first and second applications from the set of subscribers;
   foregoing receiving feedback from the plurality of subscribers other than the set of subscribers;
   providing a third set of scores associated with network parameters that are not weighted based on the first and second applications;
   generating a total quality of experience score for the plurality of subscribers based on the weighted average score of the first and second applications from the set of subscribers and the third set of scores associated with network parameters; and
   providing services over the network to the plurality of subscribers including other than the set of subscribers based on statistical analyzed feedback including the total quality of experience score from the set of subscribers.

20. The computer readable storage device of claim 19, wherein the calculating the weighted average score comprises providing an average of composite scores weighted by popularity of each application of the plurality of applications, the weighted average score comprises standardized values of latency, jitter, and packet loss weighted by a factor representing importance to each of the first and second applications.

* * * * *